United States Patent
Ono et al.

(10) Patent No.: US 12,422,098 B2
(45) Date of Patent: Sep. 23, 2025

(54) PORTABLE CARGO HANDLING EQUIPMENT FOR LIQUID HYDROGEN AND EMERGENCY RELEASE METHOD

(71) Applicant: KAWASAKI JUKOGYO KABUSHIKI KAISHA, Kobe (JP)

(72) Inventors: Tsutomu Ono, Kobe (JP); Takako Oshibe, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 22 days.

(21) Appl. No.: 18/269,402

(22) PCT Filed: Dec. 22, 2021

(86) PCT No.: PCT/JP2021/047581
§ 371 (c)(1),
(2) Date: Jun. 23, 2023

(87) PCT Pub. No.: WO2022/138721
PCT Pub. Date: Jun. 30, 2022

(65) Prior Publication Data
US 2024/0052977 A1    Feb. 15, 2024

(30) Foreign Application Priority Data
Dec. 25, 2020    (JP) .................. 2020-217761

(51) Int. Cl.
*F17C 5/02*    (2006.01)
(52) U.S. Cl.
CPC ........ *F17C 5/02* (2013.01); *F17C 2205/0326* (2013.01); *F17C 2205/0332* (2013.01);
(Continued)

(58) Field of Classification Search
CPC ................ F17C 5/02; F17C 2205/0326; F17C 2205/0332; F17C 2205/037;
(Continued)

(56) References Cited

U.S. PATENT DOCUMENTS

| | | | | |
|---|---|---|---|---|
| 4,883,099 A | * | 11/1989 | Vanommeren | F17C 5/02 141/83 |
| 5,916,246 A | * | 6/1999 | Viegas | F17C 5/02 62/50.1 |

(Continued)

FOREIGN PATENT DOCUMENTS

| | | |
|---|---|---|
| AU | 2015325623 B2 | 2/2018 |
| CN | 105156880 A * | 12/2015 |

(Continued)

OTHER PUBLICATIONS

WO-2016051768-A1 English Translation of Specification (Year: 2023).*

(Continued)

*Primary Examiner* — Kenneth Rinehart
*Assistant Examiner* — Stephanie A Shrieves
(74) *Attorney, Agent, or Firm* — Oliff PLC (57) ABSTRACT

A portable cargo handling equipment includes: a liquid hydrogen pipe which includes a first joint connectable to an end portion of a ship-side liquid pipe extending from the ship-side cryogenic tank and a second joint connectable to an end portion of a land-side liquid pipe extending from the land-side cryogenic tank; an emergency release coupling located at the liquid hydrogen pipe; a shutoff valve located between the emergency release coupling and second joint; and an atmosphere open structure including an atmosphere open passage including one end communicating with a portion of the liquid hydrogen pipe which is located between first joint and shutoff valve, and the other end that is open to (Continued)

an atmosphere, an on-off valve that opens and closes the atmosphere open passage; and a heater that is located at atmosphere open passage and heats the liquid hydrogen or hydrogen gas and guided by the atmosphere open passage.

5 Claims, 3 Drawing Sheets

(52) U.S. Cl.
CPC ............................ *F17C 2205/0352* (2013.01); *F17C 2205/037* (2013.01); *F17C 2221/012* (2013.01); *F17C 2223/0161* (2013.01); *F17C 2227/0302* (2013.01); *F17C 2265/061* (2013.01); *F17C 2270/0105* (2013.01); *F17C 2270/0171* (2013.01)

(58) Field of Classification Search
CPC ........ F17C 2221/012; F17C 2223/0161; F17C 2227/0302; F17C 2265/061; F17C 2270/0105; F17C 2270/0171; F17C 2225/0161; F17C 2225/033; F17C 2205/0364; F17C 2223/033; F17C 2227/135; F17C 2265/065; F17C 2270/0184; Y02E 60/32; B67D 9/00; B63B 25/16; B63B 27/34
USPC ............................................................ 141/1
See application file for complete search history.

(56) References Cited

U.S. PATENT DOCUMENTS

| | | | | |
|---|---|---|---|---|
| 6,681,815 B1* | 1/2004 | Westrich | ............... | B67D 7/3272 141/83 |
| 6,886,611 B2* | 5/2005 | Dupont | ................... | B67D 9/00 414/139.4 |
| 7,021,341 B2* | 4/2006 | Viegas | ...................... | F17C 9/00 141/82 |
| 8,286,678 B2* | 10/2012 | Adkins | ................... | B63B 27/34 114/230.15 |
| 10,589,826 B2* | 3/2020 | Gelin | ....................... | B63B 27/34 |
| 10,919,756 B2* | 2/2021 | Vega Perez | ............ | F17C 13/082 |
| 12,264,784 B2* | 4/2025 | Oshibe | ...................... | F17C 5/02 |
| 2006/0156744 A1* | 7/2006 | Cusiter | ..................... | F17C 7/04 62/53.2 |
| 2009/0113712 A1* | 5/2009 | McKitish | ................. | F17C 7/02 29/890.035 |
| 2018/0202608 A1* | 7/2018 | Unno | ....................... | B67D 9/00 |
| 2019/0383435 A1* | 12/2019 | Lilliesköld | .............. | B67D 9/00 |
| 2020/0189692 A1* | 6/2020 | Eikens | .................... | B63B 27/34 |
| 2020/0248870 A1* | 8/2020 | Allidieres | .............. | F17C 5/007 |

FOREIGN PATENT DOCUMENTS

| | | | | |
|---|---|---|---|---|
| JP | S -50139421 A | * | 11/1975 | |
| JP | S61-167000 U | | 10/1986 | |
| JP | S62-237199 A | | 10/1987 | |
| JP | 2011001992 A | * | 1/2011 | |
| JP | 2020-104830 A | | 7/2020 | |
| WO | WO-2016051768 A1 | * | 4/2016 | ............ B63B 27/24 |
| WO | WO-2016052374 A1 | * | 4/2016 | ............ B63B 27/24 |
| WO | 2017/010095 A1 | | 1/2017 | |

OTHER PUBLICATIONS

JPS-50139421-A English Translation of Specification (Year: 2023).*
WO-2016052374-A1 English Translation of Specification (Year: 2024).*
CN-105156880-A English Translation of Specification (Year: 2024).*
JP-2011001992-A English Translation of Specification (Year: 2024).*
Dec. 6, 2022 Written Opinion issued in International Patent Application No. PCT/JP2021/047581.

* cited by examiner

PORTABLE CARGO HANDLING EQUIPMENT FOR LIQUID HYDROGEN AND EMERGENCY RELEASE METHOD

CROSS-REFERENCE TO RELATED APPLICATIONS

This is a national phase application of PCT/JP2021/047581 filed on Dec. 22, 2021, claiming priority to Japanese Patent application No. 2020-217761 filed on Dec. 25, 2020, the contents of which are incorporated herein by reference.

TECHNICAL FIELD

The present disclosure relates to portable cargo handling equipment for liquid hydrogen which transfers the liquid hydrogen between a ship-side cryogenic tank and a land-side cryogenic tank, and also relates to an emergency release method.

BACKGROUND ART

As equipment that handles a cryogenic fluid between a ship-side cryogenic tank and a land-side cryogenic tank, PTL 1 discloses a movable body including a fluid flow pipe through which LNG flows between the land-side cryogenic tank and the ship-side cryogenic tank, in order to improve the degree of freedom related to geographical restriction when handling the cryogenic fluid.

This movable body includes: an emergency shutoff valve that shuts off the flow of the fluid in the fluid flow pipe between a ship and cargo handling equipment; and an emergency release coupling (ERC) that separates the ship and the cargo handling equipment from each other in an emergency. For example, when the ship moves due to a sudden blast of wind during the handling of the cryogenic fluid, the emergency release coupling is uncoupled, and therefore, the ship and the cargo handling equipment are separated from each other.

CITATION LIST

Patent Literature

PTL 1: Japanese Laid-Open Patent Application Publication No. 2020-104830

SUMMARY OF INVENTION

Technical Problem

Typically, the emergency release coupling has a shutoff function that prevents the fluid from leaking when the emergency release coupling is uncoupled. When the emergency release coupling of the movable body of PTL 1 has the shutoff function, the LNG can be prevented from leaking after the uncoupling of the emergency release coupling. However, during the operation of the emergency release coupling, the LNG slightly leaks. In addition, the amount of leakage of the LNG increases as the pressure of the LNG in the fluid flow pipe increases.

The boiling point of the LNG is about −161° C. that is higher than the boiling point (about −196° C.) of nitrogen and the boiling point (about −183° C.) of oxygen, whereas the boiling point of liquid hydrogen is about −253° C. that is lower than the boiling point of nitrogen and the boiling point of oxygen. Therefore, according to equipment that handles not the LNG but the liquid hydrogen, when the liquid hydrogen leaks at the time of the uncoupling of the emergency release coupling, air around the emergency release coupling is cooled, and this generates liquid air.

An object of the present disclosure to provide portable cargo handling equipment for liquid hydrogen and an emergency release method, each of which can suppress the amount of leakage of the liquid hydrogen when uncoupling an emergency release coupling.

Solution to Problem

In order to solve the above problems, portable cargo handling equipment for liquid hydrogen according to one aspect of the present disclosure is portable cargo handling equipment for liquid hydrogen. The portable cargo handling equipment is located between a ship-side cryogenic tank and a land-side cryogenic tank and transfers the liquid hydrogen from one of the ship-side cryogenic tank and the land-side cryogenic tank to the other. The portable cargo handling equipment includes: a liquid hydrogen pipe through which the liquid hydrogen is guided and which includes a first joint connectable to an end portion of a ship-side liquid pipe extending from the ship-side cryogenic tank and a second joint connectable to an end portion of a land-side liquid pipe extending from the land-side cryogenic tank; an emergency release coupling located at the liquid hydrogen pipe; a shutoff valve located at a portion of the liquid hydrogen pipe which is located between the emergency release coupling and the second joint; and an atmosphere open structure including an atmosphere open passage including one end communicating with a portion of the liquid hydrogen pipe which is located between the first joint and the shutoff valve, and the other end that is open to an atmosphere, an on-off valve that opens and closes the atmosphere open passage, and a heating device that is located at the atmosphere open passage and heats the liquid hydrogen guided by the atmosphere open passage or a hydrogen gas generated by evaporation of the liquid hydrogen and guided by the atmosphere open passage.

Moreover, an emergency release method according to one aspect of the present disclosure is an emergency release method of dividing a liquid hydrogen transfer system into a ship side and a land side in an emergency, the liquid hydrogen transfer system including: a liquid pipe that guides liquid hydrogen from one of a ship-side cryogenic tank and a land-side cryogenic tank to the other; an emergency release coupling located at the liquid pipe; a first shutoff valve located at a portion of the liquid pipe which is located between the emergency release coupling and the land-side cryogenic tank; a second shutoff valve located at a portion of the liquid pipe which is located between the emergency release coupling and the ship-side cryogenic tank; and an on-off valve by which a portion of the liquid pipe which is located between the first shutoff valve and the second shutoff valve is open to an atmosphere. The emergency release method includes: closing the first shutoff valve and the second shutoff valve; opening the on-off valve; and starting uncoupling the emergency release coupling after closing the first shutoff valve and the second shutoff valve and opening the on-off valve.

Advantageous Effects of Invention

The present disclosure can suppress the amount of leakage of the liquid hydrogen when uncoupling the emergency release coupling.

DESCRIPTION OF EMBODIMENTS

Hereinafter, an embodiment of the present disclosure will be described with reference to the drawings.

Figure 1:
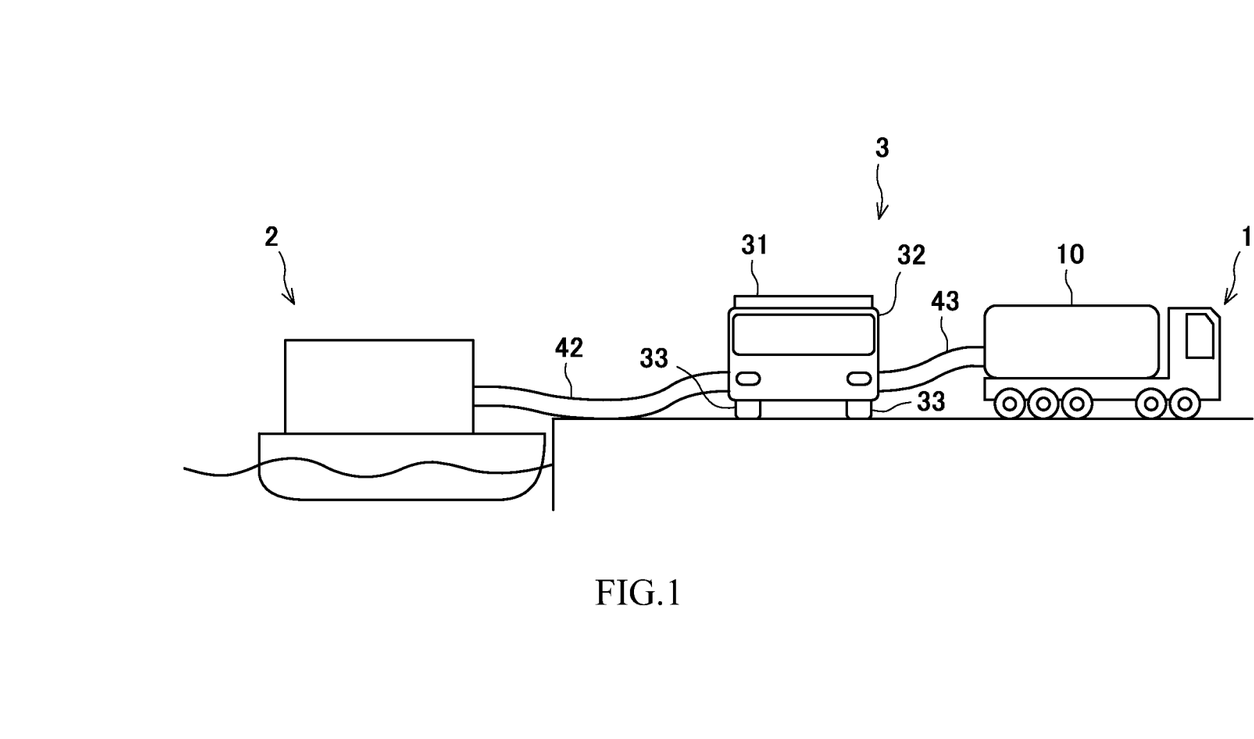
FIG. 1 is a diagram showing that portable cargo handling equipment according to an embodiment is connected to a land-side cryogenic tank and a ship-side cryogenic tank.

FIG. 1 is a diagram showing that portable cargo handling equipment 3 according to the embodiment is connected to a land-side cryogenic tank 10 and a ship-side cryogenic tank 20. In the present embodiment, the land-side cryogenic tank 10 is a tank that is a part of a tank truck 1. The land-side cryogenic tank 10 may be a tank that is a part of a tank container carried by a traveling vehicle, or the like. The ship-side cryogenic tank 20 is, for example, a fuel tank or a cargo tank mounted on a ship 2. The tank truck 1, the ship 2, and the portable cargo handling equipment 3 are included in a liquid hydrogen transfer system that transfers liquid hydrogen from one of the land-side cryogenic tank and the ship-side cryogenic tank to the other.

The portable cargo handling equipment 3 is cargo handling equipment that transfers the liquid hydrogen from one of the land-side cryogenic tank 10 and the ship-side cryogenic tank 20 to the other. In the present embodiment, the portable cargo handling equipment 3 transfers the liquid hydrogen from the land-side cryogenic tank 10 to the ship-side cryogenic tank 20. Moreover, in the present embodiment, the portable cargo handling equipment 3 is a traveling vehicle including: a frame 31; a vehicle body 32 supporting the frame 31; and a traveling driving source that is supported by the vehicle body 32 and drives wheels supporting the vehicle body 32. Various devices included in the portable cargo handling equipment 3 are supported by the frame 31. The frame 31 is, for example, a container frame.

Figure 2:
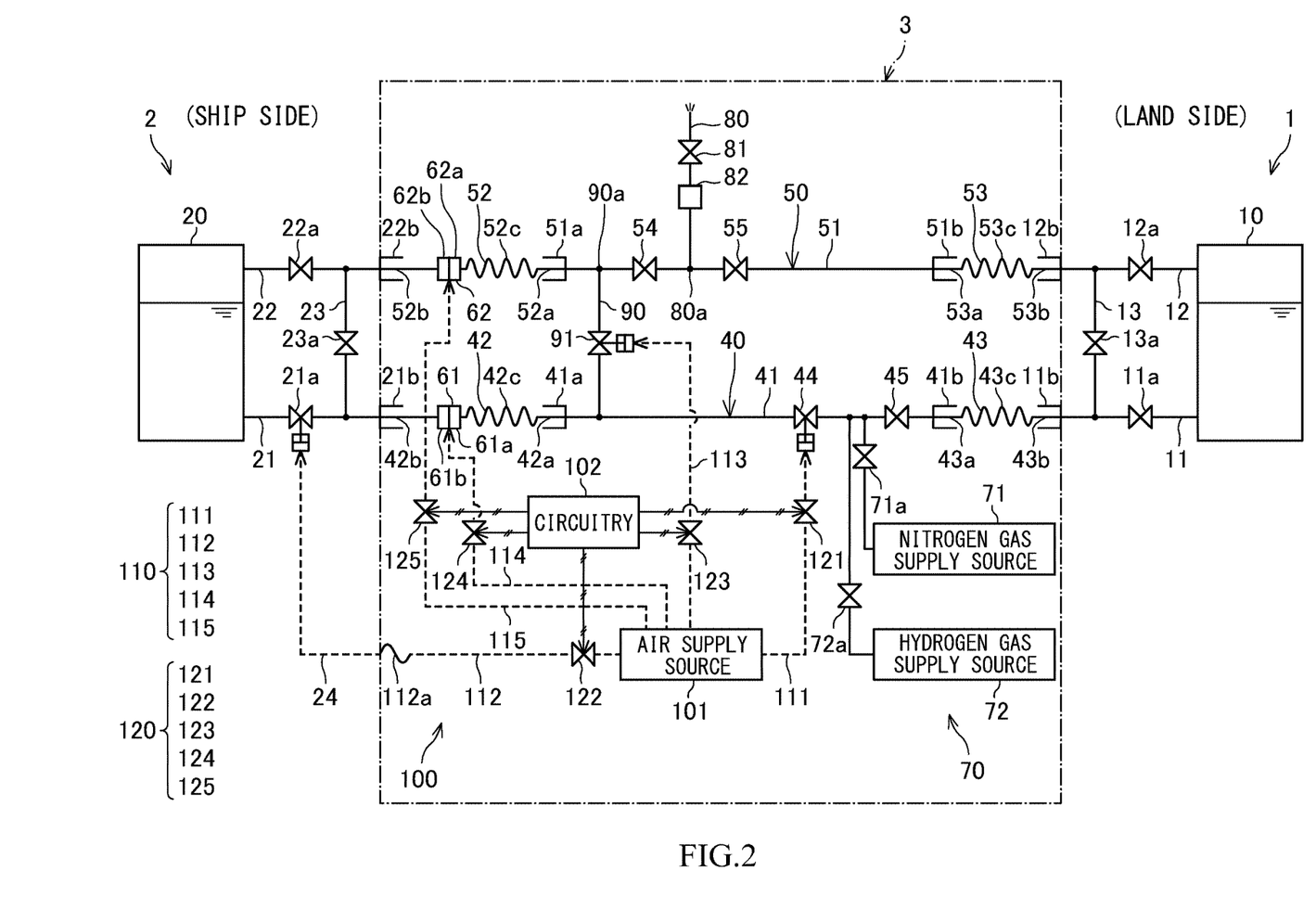
FIG. 2 is a piping system diagram of a liquid hydrogen transfer system shown in FIG. 1.

FIG. 2 is a piping system diagram of the liquid hydrogen transfer system shown in FIG. 1. In the following description, for convenience sake, a side of the piping system which is close to the land-side cryogenic tank 10 is referred to as a "land side," and a side of the piping system which is close to the ship-side cryogenic tank 20 is referred to as a "ship side." In FIG. 2, a piping system for air supply in a below-described control system 100 is shown by broken lines in order to distinguish the piping system for the air supply from the piping system for the cryogenic fluid.

The tank truck 1 includes: the land-side cryogenic tank 10; a land-side liquid pipe 11 extending from the land-side cryogenic tank 10; and a land-side gas pipe 12 extending from the land-side cryogenic tank 10.

The land-side liquid pipe 11 is connected to a lower portion of the land-side cryogenic tank 10. In the present embodiment, the land-side liquid pipe 11 is connected to a liquid phase portion of the land-side cryogenic tank 10 that stores the liquid hydrogen. A shutoff valve 11a is located at the land-side liquid pipe 11. Moreover, a joint 11b is located at an end portion of the land-side liquid pipe 11 which is opposite to the land-side cryogenic tank 10.

The land-side gas pipe 12 is connected to an upper portion of the land-side cryogenic tank 10. In the present embodiment, the land-side gas pipe 12 is connected to a gas phase portion of the land-side cryogenic tank 10 that stores the liquid hydrogen. A boil off gas closing valve 12a is located at the land-side gas pipe 12. Moreover, a joint 12b is located at an end portion of the land-side gas pipe 12 which is opposite to the land-side cryogenic tank 10.

Moreover, a portion of the land-side liquid pipe 11 which is located between the shutoff valve 11a and the joint 11b and a portion of the land-side gas pipe 12 which is located between the boil off gas closing valve 12a and the joint 12b are connected to each other by a land-side connection pipe 13. An on-off valve 13a is located at the land-side connection pipe 13. The land-side connection pipe 13 includes a passage through which a purge gas flows by a below-described purge gas supply device 70.

The ship 2 includes: the ship-side cryogenic tank 20; a ship-side liquid pipe 21 extending from the ship-side cryogenic tank 20; and a ship-side gas pipe 22 extending from the ship-side cryogenic tank 20.

The ship-side liquid pipe 21 is connected to a lower portion of the ship-side cryogenic tank 20. In the present embodiment, the ship-side liquid pipe 21 is connected to a liquid phase portion of the ship-side cryogenic tank 20 that stores the liquid hydrogen. A shutoff valve 21a is located at the ship-side liquid pipe 21. The shutoff valve 21a is one example of a second shutoff valve. The shutoff valve 21a is an air drive valve with an air cylinder to which air is supplied. In the present embodiment, the shutoff valve 21a is a so-called normally closed valve which is in a closed state when air is not supplied, and is switched from the closed state to an open state when air is supplied. The ship 2 includes a ship-side air pipe 24 through which air is guided to the shutoff valve 21a. Air is supplied to the shutoff valve 21a through the ship-side air pipe 24. Moreover, a joint 21b is located at an end portion of the ship-side liquid pipe 21 which is opposite to the ship-side cryogenic tank 20.

The ship-side gas pipe 22 is connected to an upper portion of the ship-side cryogenic tank 20. In the present embodiment, the ship-side gas pipe 22 is connected to a gas phase portion of the ship-side cryogenic tank 20 that stores the liquid hydrogen. A boil off gas closing valve 22a is located at the ship-side gas pipe 22. Moreover, a joint 22b is located at an end portion of the ship-side gas pipe 22 which is opposite to the ship-side cryogenic tank 20.

Moreover, a portion of the ship-side liquid pipe 21 which is located between the shutoff valve 21a and the joint 21b and a portion of the ship-side gas pipe 22 which is located between the boil off gas closing valve 22a and the joint 22b are connected to each other by a ship-side connection pipe 23. An on-off valve 23a is located at the ship-side connection pipe 23. The ship-side connection pipe 23 includes a passage through which the purge gas flows by the below-described purge gas supply device 70.

The portable cargo handling equipment 3 includes a liquid hydrogen pipe 40 and a hydrogen gas pipe 50. Each of the liquid hydrogen pipe 40 and the hydrogen gas pipe 50 may include, for example, a known double pipe structure or a single pipe structure around which a thermal insulator is wound. One end of the liquid hydrogen pipe 40 is connected to a ship-side end portion of the land-side liquid pipe 11, and the other end of the liquid hydrogen pipe 40 is connected to a land-side end portion of the ship-side liquid pipe 21. Moreover, one end of the hydrogen gas pipe 50 is connected to a ship-side end portion of the land-side gas pipe 12, and the other end of the hydrogen gas pipe 50 is connected to a land-side end portion of the ship-side gas pipe 22.

Specifically, the liquid hydrogen pipe 40 includes a fixed liquid pipe 41, a first hose 42 connected to one end of the fixed liquid pipe 41, and a second hose 43 connected to the other end of the fixed liquid pipe 41.

The fixed liquid pipe 41 is fixed to the frame 31 by a fixture. The fixed liquid pipe 41 is a pipe that is higher in rigidity than below-described flexible hose portions 42c and 43c. Joints 41a and 41b are respectively located at both ends of the fixed liquid pipe 41.

At least a part of the first hose 42 includes the flexible hose portion 42c. A joint 42a that is connectable to the joint 41a of the fixed liquid pipe 41 is located at one end of the first hose 42, and a joint 42b that is connectable to the joint 21b of the ship-side liquid pipe 21 is located at the other end of the first hose 42. The joint 42b is one example of a first joint.

At least a part of the second hose 43 includes the flexible hose portion 43c. A joint 43a that is connectable to the joint 41b of the fixed liquid pipe 41 is located at one end of the second hose 43, and a joint 43b that is connectable to the joint 11b of the land-side liquid pipe 11 is located at the other end of the second hose 43. The joint 43b is one example of a second joint.

Moreover, the hydrogen gas pipe 50 includes a fixed gas pipe 51, a third hose 52 connected to one end of the fixed gas pipe 51, and a fourth hose 53 connected to the other end of the fixed gas pipe 51.

The fixed gas pipe 51 is fixed to the frame 31 by a fixture. The fixed gas pipe 51 is a pipe that is higher in rigidity than below-described flexible hose portions 52c and 53c. Joints 51a and 51b are respectively located at both ends of the fixed gas pipe 51.

At least a part of the third hose 52 includes the flexible hose portion 52c. A joint 52a that is connectable to the joint 51a of the fixed gas pipe 51 is located at one end of the third hose 52, and a joint 52b that is connectable to the joint 22b of the ship-side gas pipe 22 is located at the other end of the third hose 52. The joint 52b is one example of a third joint.

At least a part of the fourth hose 53 includes the flexible hose portion 53c. A joint 53a that is connectable to the joint 51b of the fixed gas pipe 51 is located at one end of the fourth hose 53, and a joint 53b that is connectable to the joint 12b of the land-side gas pipe 12 is located at the other end of the fourth hose 53.

While the portable cargo handling equipment 3 is moving, such as while the portable cargo handling equipment 3 is moving to a cargo handling site, the first hose 42, the second hose 43, the third hose 52, and the fourth hose 53 are disconnected from the fixed liquid pipe 41 and the fixed gas pipe 51. For example, while the portable cargo handling equipment 3 is moving, the first hose 42, the second hose 43, the third hose 52, and the fourth hose 53 are supported by the frame 31.

A first emergency release coupling 61 is located at the liquid hydrogen pipe 40. In the present embodiment, the first emergency release coupling 61 is located at the first hose 42 of the liquid hydrogen pipe 40. More specifically, the first emergency release coupling 61 is located at a portion of the first hose 42 which is located between the joint 42b and the flexible hose portion 42c.

A second emergency release coupling 62 is located at the hydrogen gas pipe 50. In the present embodiment, the second emergency release coupling 62 is located at the third hose 52 of the hydrogen gas pipe 50. More specifically, the second emergency release coupling 62 is located at a portion of the third hose 52 which is located between the joint 52b and the flexible hose portion 52c.

The first emergency release coupling 61 has a shutoff function that prevents a fluid from leaking when the first emergency release coupling 61 is uncoupled. Specifically, the first emergency release coupling 61 includes: a first unit 61a located at the land side; and a second unit 61b located at the ship side and separably connected to the first unit 61a by a coupling means. Each of the first unit 61a and the second unit 61b includes therein an emergency shutoff valve. These emergency shutoff valves are switched to a valve-closed state when the first emergency release coupling 61 is made to be uncoupled. The first unit 61a corresponds to a first coupling, and the second unit 61b may also be referred to as a second coupling.

The second emergency release coupling 62 has a shutoff function that prevents a fluid from leaking when the second emergency release coupling 62 is uncoupled. Specifically, the second emergency release coupling 62 includes: a first unit 62a located at the land side; and a second unit 62b located at the ship side and separably connected to the first unit 62a. Each of the first unit 62a and the second unit 62b includes therein an emergency shutoff valve. These emergency shutoff valves are switched to a valve-closed state when the second emergency release coupling 62 is made to be uncoupled.

Moreover, in the present embodiment, the first emergency release coupling 61 and the second emergency release coupling 62 are uncoupled by the supply of air. Furthermore, the first emergency release coupling 61 and the second emergency release coupling 62 can be manually operated so as to be able to be uncoupled in accordance with the determination of an operator.

A shutoff valve 44 is located at a portion of the liquid hydrogen pipe 40 which is located between the first emergency release coupling 61 and the joint 43b. The shutoff valve 44 is one example of a first shutoff valve. Specifically, the shutoff valve 44 is located at the fixed liquid pipe 41. The shutoff valve 44 is an air drive valve with an air cylinder to which air is supplied. In the present embodiment, the shutoff valve 44 is a so-called normally closed valve which is in a closed state when air is not supplied, and is switched from the closed state to an open state when air is supplied.

Moreover, a purge gas closing valve 45 is located at a portion of the liquid hydrogen pipe 40 which is located at the land side of the shutoff valve 44. Specifically, the purge gas closing valve 45 is located at a portion of the fixed liquid pipe 41 which is located between the shutoff valve 44 and the joint 41b. Moreover, a purge gas closing valve 54 is located at the fixed gas pipe 51 of the hydrogen gas pipe 50. A purge gas closing valve 55 is located at a portion of the fixed gas pipe 51 which is located between the purge gas closing valve 54 and the joint 51b.

The portable cargo handling equipment 3 further includes the purge gas supply device 70 that can selectively supply a nitrogen gas and a hydrogen gas as a purge gas to the liquid hydrogen pipe 40. Specifically, the purge gas supply device 70 includes a nitrogen gas supply source 71 and a hydrogen gas supply source 72. The nitrogen gas supply source 71 is, for example, a nitrogen gas cylinder, and a cylinder on-off valve 71a is located at a passage through which the nitrogen gas is supplied from the nitrogen gas supply source 71 to the liquid hydrogen pipe 40. The hydrogen gas supply source 72 is, for example, a hydrogen gas cylinder, and a cylinder on-off valve 72a is located at a passage through which the hydrogen gas is supplied from the hydrogen gas supply source 72 to the liquid hydrogen pipe 40. The purge gas supply device 70 supplies the nitrogen gas or the hydrogen gas as the purge gas to a portion of the liquid hydrogen pipe 40 which is located between the shutoff valve 44 and the purge gas closing valve 45. The purge gas supply device 70 corresponds to a purge gas supplier.

The portable cargo handling equipment 3 further includes a vent pipe 80. The vent pipe 80 discharges the hydrogen gas, guided from the ship-side cryogenic tank 20, to the atmosphere. Moreover, the vent pipe 80 discharges the purge gas, supplied from the purge gas supply device 70 to the liquid hydrogen pipe 40, to the atmosphere. The vent pipe 80 may have, for example, a known double pipe structure or a single pipe structure around which a thermal insulator is wound. For example, the vent pipe 80 is fixed to the frame 31 by a fixture. One end of the vent pipe 80 is connected to the hydrogen gas pipe 50. More specifically, one end of the vent pipe 80 is connected to a portion of the fixed gas pipe 51 which is located between the purge gas closing valve 54 and the purge gas closing valve 55. Moreover, the other end of the vent pipe 80 is open to the atmosphere.

A vent valve 81 is located at the vent pipe 80. The vent valve 81 opens and closes a passage formed by the vent pipe 80. Moreover, a heating device 82 is located at a portion of the vent pipe 80 which is located between the vent valve 81 and a portion of the vent pipe 80 which is connected to the fixed gas pipe 51. The heating device 82 heats the guided liquid hydrogen or the hydrogen gas generated by the evaporation of the liquid hydrogen. In the present embodiment, the heating device 82 includes a heat exchange structure that performs heat exchange between outside air and an inside cryogenic fluid. For example, the heat exchange structure is configured as a tube body formed in a bellows shape so as to heat the inside cryogenic fluid by the heat exchange with the outside air. The configuration of the heating device 82 is not limited to this. For example, as a cooling medium that performs heat exchange with the inside cryogenic fluid, the heating device 82 may use a cooling medium, such as hot water, other than air. The heating device 82 corresponds to a heater.

The hydrogen gas pipe 50 and a portion of the liquid hydrogen pipe 40 which is located between the joint 42b and the shutoff valve 44 are connected to each other by a connection pipe 90. More specifically, one end of the connection pipe 90 is connected to a portion of the fixed liquid pipe 41 which is located between the joint 41a and the shutoff valve 44, and the other end of the connection pipe 90 is connected to the fixed gas pipe 51. The connection pipe 90 may have, for example, a known double pipe structure or a single pipe structure around which a thermal insulator is wound. The diameter of the connection pipe 90 is equal to or larger than the diameter of the liquid hydrogen pipe 40. Moreover, the diameter of the connection pipe 90 is larger than the diameter of the ship-side connection pipe 23 for the purge gas.

An on-off valve 91 is located at the connection pipe 90. In the present embodiment, the on-off valve 91 is an air drive valve with an air cylinder to which air is supplied. In the present embodiment, the on-off valve 91 is a so-called normally closed valve which is in a closed state when air is not supplied, and is switched from the closed state to an open state when air is supplied.

The connection pipe 90, the vent pipe 80, and a portion of the hydrogen gas pipe 50 which is located between a connection portion 90a connected to the connection pipe 90 and a connection portion 80a connected to the vent pipe 80 are included in an atmosphere open passage (i.e., an atmosphere open pipe). To be specific, one end of the atmosphere open passage communicates with a portion of the liquid hydrogen pipe 40 which is located between the joint 42b and the shutoff valve 44, and the other end of the atmosphere open passage is open to the atmosphere. The atmosphere open passage, the on-off valve 91, and the heating device 82 are included in an atmosphere open structure.

The portable cargo handling equipment 3 includes a control system 100 that controls opening and closing operations of the on-off valve 91, opening and closing operations of the shutoff valve 21a, opening and closing operations of the shutoff valve 44, uncoupling of the first emergency release coupling 61, and uncoupling of the second emergency release coupling 62. The control system 100 includes an air supply source 101, air pipes 110, electromagnetic on-off valves 120, and circuitry 102.

The air supply source 101 supplies air through the air pipes 110 to the on-off valve 91, the shutoff valve 21a, the shutoff valve 44, the first emergency release coupling 61, and the second emergency release coupling 62. For example, a compressor, a cylinder filled with air, or the like is adopted as the air supply source 101.

The air pipes 110 includes a first air pipe 111, a second air pipe 112, a third air pipe 113, a fourth air pipe 114, and a fifth air pipe 115. The first air pipe 111 guides air from the air supply source 101 to the shutoff valve 44. One end of the second air pipe 112 is connected to one end of the ship-side air pipe 24. The second air pipe 112 and the ship-side air pipe 24 guide air from the air supply source 101 to the shutoff valve 21a. The third air pipe 113 guides air from the air supply source 101 to the on-off valve 91. The fourth air pipe 114 guides air from the air supply source 101 to the first emergency release coupling 61. The fifth air pipe 115 guides air from the air supply source 101 to the second emergency release coupling 62. Some or all of the air pipes 110 may include a common pipe.

At least a part of the second air pipe 112 includes a tube 112a that is lower in strength than the liquid hydrogen pipe 40 and the hydrogen gas pipe 50. When the ship 2 separates from a shore in an emergency or the like, the tube 112a is torn off, and therefore, the ship-side air pipe 24 can be separated from the portable cargo handling equipment 3.

The electromagnetic on-off valves 120 include a first electromagnetic on-off valve 121 located at the first air pipe 111, a second electromagnetic on-off valve 122 located at the second air pipe 112, a third electromagnetic on-off valve 123 located at the third air pipe 113, a fourth electromagnetic on-off valve 124 located at the fourth air pipe 114, and a fifth electromagnetic on-off valve 125 located at the fifth air pipe 115. Each of the electromagnetic on-off valves 120 is a so-called normally closed electromagnetic valve which is in an open state when electric power is supplied, and is in a closed state when electric power is not supplied.

The air supply source 101, the air pipes 110, and the electromagnetic on-off valves 120 are included in an air supply device controlled by the circuitry 102. The air supply device corresponds to an air supplier.

The circuitry 102 controls the electromagnetic on-off valves 120 to control opening and closing operations of the on-off valve 91, opening and closing operations of the shutoff valve 21a, opening and closing operations of the shutoff valve 44, uncoupling of the first emergency release coupling 61, and uncoupling of the second emergency release coupling 62. The circuitry 102 includes: a calculation processing unit, such as a CPU; and a storage unit, such as a ROM and a RAM. Moreover, the control of the electromagnetic on-off valves 120 is realized in such a manner that in the circuitry 102, the calculation processing unit executes a predetermined program stored in the storage unit.

Method of Transferring Liquid Hydrogen

Next, a method of transferring the liquid hydrogen by using the portable cargo handling equipment 3 will be described. The transferring method described below is a method of transferring the liquid hydrogen from the land-side cryogenic tank 10 to the ship-side cryogenic tank 20. Moreover, in the following description, the shutoff valve 21a, the shutoff valve 44, and the on-off valve 91 are opened or closed by being controlled by the circuitry 102, and the valves other than these valves are opened or closed by manual operation of the operator.

First, the portable cargo handling equipment 3 is coupled to the land-side cryogenic tank 10 and the ship-side cryogenic tank 20. Specifically, the ship 2 is moored at a port, and the tank truck 1 is located on land close to a moored position of the ship 2. Moreover, the portable cargo handling equipment 3 is located on land close to the tank truck 1. Then, as shown in FIG. 1, the portable cargo handling equipment 3 is located between the land-side cryogenic tank 10 and the ship-side cryogenic tank 20. The first hose 42 is connected to the fixed liquid pipe 41 and the ship-side liquid pipe 21. The second hose 43 is connected to the fixed liquid pipe 41 and the land-side liquid pipe 11. The third hose 52 is connected to the fixed gas pipe 51 and the ship-side gas pipe 22. The fourth hose 53 is connected to the fixed gas pipe 51 and the land-side gas pipe 12. Moreover, the second air pipe 112 and the ship-side air pipe 24 are connected to each other. In FIG. 1, for simplicity, only the first hose 42 and the second hose 43 are shown, and the third hose 52, the fourth hose 53, the second air pipe 112, and the ship-side air pipe 24 are not shown.

Next, air in the pipes is purged with the nitrogen gas. Specifically, first, in the piping system for the liquid hydrogen, the cylinder on-off valve 71a, the purge gas closing valve 45, the on-off valve 13a, the purge gas closing valve 55, and the vent valve 81 are set to an open state, and the valves other than these valves (the valves other than these valves do not include the valves in an air supply system) are set to a closed state. Then, the nitrogen gas is supplied by the nitrogen gas supply source 71. With this, air in the pipes of a portion of the piping system for the liquid hydrogen which is located at the land side of the nitrogen gas supply source 71 and the vent pipe 80 is discharged through the vent pipe 80.

Moreover, in the piping system for the liquid hydrogen, the cylinder on-off valve 71a, the shutoff valve 44, the on-off valve 23a, the purge gas closing valve 54, and the vent valve 81 are set to an open state, and the valves other than these valves (the valves other than these valves do not include the valves in the air supply system) are set to a closed state. Then, the nitrogen gas is supplied by the nitrogen gas supply source 71. With this, air in the pipes of a portion of the piping system for the liquid hydrogen which is located at the ship side of the nitrogen gas supply source 71 and the vent pipe 80 is discharged through the vent pipe 80.

Next, the nitrogen gas in the pipes is purged with the hydrogen gas. Specifically, first, in the piping system for the liquid hydrogen, the cylinder on-off valve 72a, the purge gas closing valve 45, the on-off valve 13a, the purge gas closing valve 55, and the vent valve 81 are set to an open state, and the valves other than these valves (the valves other than these valves do not include the valves in the air supply system) are set to a closed state. Then, the hydrogen gas is supplied by the hydrogen gas supply source 72. With this, the nitrogen gas in the pipes of the portion of the piping system for the liquid hydrogen which is located at the land side of the hydrogen gas supply source 72 and the vent pipe 80 is discharged through the vent pipe 80.

Moreover, in the piping system for the liquid hydrogen, the cylinder on-off valve 72a, the shutoff valve 44, the on-off valve 23a, the purge gas closing valve 54, and the vent valve 81 are set to an open state, and the valves other than these valves (the valves other than these valves do not include the valves in the air supply system) are set to a closed state. Then, the hydrogen gas is supplied by the hydrogen gas supply source 72. With this, the nitrogen gas in the pipes of the portion of the piping system for the liquid hydrogen which is located at the ship side of the hydrogen gas supply source 72 and the vent pipe 80 is discharged through the vent pipe 80.

Next, the liquid hydrogen is transferred from the land-side cryogenic tank 10 to the ship-side cryogenic tank 20. Specifically, first, in the piping system for the liquid hydrogen, the shutoff valve 11a, the purge gas closing valve 45, the shutoff valve 44, the shutoff valve 21a, the boil off gas closing valve 22a, the purge gas closing valve 54, and the vent valve 81 are set to an open state, and the valves other than these valves (the valves other than these valves do not include the valves in the air supply system) are set to a closed state. Then, the liquid hydrogen is supplied by pressure from the land-side cryogenic tank 10 to the ship-side cryogenic tank 20 through the land-side liquid pipe 11, the liquid hydrogen pipe 40, and the ship-side liquid pipe 21. For example, the supply of the liquid hydrogen by pressure may be realized by a self-pressurizing system of the tank truck 1 or by including a pump in the portable cargo handling equipment 3.

Moreover, while the liquid hydrogen is supplied to the ship-side cryogenic tank 20, the hydrogen gas generated by the evaporation of the liquid hydrogen in the ship-side cryogenic tank 20 can be discharged through the ship-side gas pipe 22, the hydrogen gas pipe 50, and the vent pipe 80. With this, the pressure of the gas phase in the ship-side cryogenic tank 20 is released, and therefore, the liquid hydrogen can be supplied by pressure from the land-side cryogenic tank 10 to the ship-side cryogenic tank 20 with small power.

Emergency Release Method

The following will describe an emergency release method of separating the ship 2 and the portable cargo handling equipment 3 from each other in an emergency, such as when strong wind, a tsunami, or an earthquake occurs while the liquid hydrogen is transferred. The emergency release method described in the present embodiment is executed by sequence control performed by the circuitry 102.

As a first step, the shutoff valve 44 and the shutoff valve 21a are closed. With this, the transfer of the liquid hydrogen from the land-side cryogenic tank 10 to the ship-side cryogenic tank 20 is blocked. Moreover, the liquid hydrogen having high pressure remains in a portion of a liquid pipe which includes the land-side liquid pipe 11, the liquid hydrogen pipe 40, and the ship-side liquid pipe 21 and through which the liquid hydrogen is guided from the land-side cryogenic tank 10 to the ship-side cryogenic tank 20, the portion being located between the shutoff valve 44 and the shutoff valve 21a which are in a closed state. In addition to the shutoff valve 44 and the shutoff valve 21a, the shutoff valve 11a and the boil off gas closing valve 22a are also closed.

Next, as a second step, the on-off valve 91 is opened. The vent valve 81 is in an open state while the liquid hydrogen is transferred. Therefore, by opening the on-off valve 91, the liquid hydrogen remaining between the shutoff valve 44 and the shutoff valve 21a is depressurized.

Next, as a third step, the first emergency release coupling 61 and the second emergency release coupling 62 start being uncoupled. While the first emergency release coupling 61 is operating, the liquid hydrogen slightly leaks. However, since the pressure of the liquid hydrogen remaining between the shutoff valve 44 and the shutoff valve 21a has been reduced in the second step, the amount of leakage of the liquid hydrogen is suppressed to a small amount.

As described above, in the present embodiment, by opening the on-off valve 91 before uncoupling the first emergency release coupling 61, the pressure of the liquid hydrogen remaining in the portion of the liquid pipe which is located between the shutoff valve 44 and the shutoff valve 21a can be reduced. Thus, the difference between the pressure of the remaining liquid hydrogen and the atmospheric pressure can be reduced, and therefore, the amount of leakage of the liquid hydrogen when uncoupling the first emergency release coupling 61 can be suppressed.

Moreover, the liquid hydrogen or the hydrogen gas generated by the evaporation of the liquid hydrogen can be heated by the heating device 82 located at the vent pipe 80. With this, the liquid hydrogen can be prevented from flowing out to the atmosphere through the vent pipe 80, and the generation of the liquid air can be suppressed by the hydrogen gas discharged to the atmosphere at the end portion of the vent pipe 80.

Moreover, in the present embodiment, while the liquid hydrogen is supplied from the land-side cryogenic tank 10 to the ship-side cryogenic tank 20, the hydrogen gas generated by the evaporation of the liquid hydrogen in the ship-side cryogenic tank 20 can be discharged to the atmosphere through the ship-side gas pipe 22, the hydrogen gas pipe 50, and the vent pipe 80. Therefore, the pressure increase of the ship-side cryogenic tank 20 can be suppressed, and the liquid hydrogen can be transferred from the land-side cryogenic tank 10 to the ship-side cryogenic tank 20 with small power. Moreover, the heating device 82 can be used for both of the heating performed when the hydrogen gas generated by the evaporation in the ship-side cryogenic tank 20 is discharged to the atmosphere and the heating performed when the hydrogen gas generated by the evaporation of the remaining liquid hydrogen at the time of the uncoupling of the first emergency release coupling 61 is discharged to the atmosphere.

Moreover, in the present embodiment, the diameter of the connection pipe 90 is equal to or larger than the diameter of the liquid hydrogen pipe 40. Therefore, before uncoupling the first emergency release coupling 61, the depressurization of the liquid hydrogen remaining between the shutoff valve 44 and the shutoff valve 21a can be quickly executed. Furthermore, the diameter of the connection pipe 90 is larger than the diameter of the ship-side connection pipe 23 for the purge gas. Therefore, in the second step, when the on-off valve 91 of the connection pipe 90 is opened, the depressurization of the liquid hydrogen remaining between the shutoff valve 44 and the shutoff valve 21a can be executed more quickly than when the on-off valve 23a of the ship-side connection pipe 23 is opened.

Since air and nitrogen are solidified by the liquid hydrogen, the pipes need to be filled with the hydrogen gas before transferring the liquid hydrogen. Moreover, in the present embodiment, the portable cargo handling equipment 3 includes the purge gas supply device 70 that can selectively supply the nitrogen gas and the hydrogen gas as the purge gas to the liquid hydrogen pipe 40. Therefore, in the portable cargo handling equipment, air in the pipes can be purged with the nitrogen gas, and then, the nitrogen gas in the pipes can be purged with the hydrogen gas.

Moreover, in the present embodiment, after the shutoff valve 44 is closed and before the uncoupling of the first emergency release coupling 61 starts, the circuitry 102 controls the opening and closing operations of the on-off valve 91 so as to open the on-off valve 91. Therefore, before uncoupling the first emergency release coupling 61, the pressure of the liquid hydrogen remaining between the shutoff valve 44 and the shutoff valve 21a can be automatically reduced.

Moreover, in the present embodiment, in addition to the opening and closing operations of the on-off valve 91, the circuitry 102 controls the opening and closing operations of the shutoff valve 44 and the uncoupling of the first emergency release coupling 61. Therefore, a series of steps of closing the shutoff valve 44, opening the on-off valve 91, and then uncoupling the first emergency release coupling 61 can be automatically executed by the circuitry 102.

Moreover, in the present embodiment, in addition to the opening and closing operations of the shutoff valve 44, the circuitry 102 controls the opening and closing operations of the shutoff valve 21a located at the ship-side liquid pipe 21. Therefore, both of the shutoff valve 44 included in the portable cargo handling equipment 3 and the shutoff valve 21a that is a device at the ship side can be operated by the circuitry 102 of the portable cargo handling equipment 3. On this account, the shutoff valve 44 and the shutoff valve 21a can be easily operated at the same time.

Moreover, in the present embodiment, the shutoff valve 21a that is equipment at the ship side can be driven by the presence or absence of air supply. Therefore, without including in the ship 2 a wire used to send a control signal to the shutoff valve 21a, the shutoff valve 21a can be controlled from the portable cargo handling equipment 3.

Other Embodiments

The present disclosure is not limited to the above embodiment, and various modifications may be made within the scope of the present disclosure.

For example, in the piping system, the diameters and rigidity of the pipes, the positions of the devices located at the pipes, and the connection portions between the pipes are not limited to those described in the above embodiment.

The positions of the first emergency release coupling 61 and the second emergency release coupling 62 are not limited to those described in the above embodiment. For example, the first emergency release coupling 61 may be located at the fixed liquid pipe 41, not the first hose 42 in the liquid hydrogen pipe 40. The second emergency release coupling 62 may be located at the fixed gas pipe 51, not the third hose 52 in the hydrogen gas pipe 50.

Moreover, the heating device 82 does not have to be located at the vent pipe 80. For example, the heating device 82 may be located at a portion of the hydrogen gas pipe 50 which is located between the connection portion 90a connected to the connection pipe 90 and the connection portion 80a connected to the vent pipe 80 or may be located at a portion of the connection pipe 90 which is located between the connection portion 90a and the on-off valve 91.

Moreover, in the above embodiment, the purge gas supply device 70 can selectively supply the nitrogen gas and the hydrogen gas as the purge gas to the liquid hydrogen pipe 40. However, the configuration of the purge gas supply device 70 is not limited to this. For example, the purge gas supply device 70 may be able to supply a helium gas to the liquid hydrogen pipe 40 as the purge gas with which air is purged.

Moreover, a control target of the circuitry 102 is not limited to the air supply device. For example, the circuitry 102 may control the purge gas supply device 70, i.e., the cylinder on-off valves 71a and 72a. Furthermore, the circuitry 102 may control some or all of the purge gas closing valves 45, 54, and 55 and the vent valve 81. Some or all of the purge gas closing valves 45, 54, and 55, the vent valve 81, and the cylinder on-off valves 71a and 72a may be air drive valves.

Each of the shutoff valve 21a, the shutoff valve 44, and the on-off valve 91 may be a so-called normally open valve that switches from a closed state to an open state when air supply stops. Each of the electromagnetic on-off valves 120 is a so-called normally open electromagnetic valve which is in a closed state when electric power is supplied, and is in an open state when electric power is not supplied.

Moreover, in the above embodiment, the circuitry 102 controls the opening and closing operations of the on-off valve 91, the opening and closing operations of the shutoff valve 21a, the opening and closing operations of the shutoff valve 44, the uncoupling of the first emergency release coupling 61, and the uncoupling of the second emergency release coupling 62. However, the circuitry 102 may control only some of these components, and the components that are not controlled by the circuitry 102 may be manually operated by the operator.

Moreover, in the above embodiment, the opening and closing operations of the on-off valve 91, the opening and closing operations of the shutoff valve 21a, the opening and closing operations of the shutoff valve 44, the uncoupling of the first emergency release coupling 61, and the uncoupling of the second emergency release coupling 62 are controlled by the supply of the air from the air supply source 101. However, the present disclosure is not limited to this. For example, each of the on-off valve 91, the shutoff valve 21a, the shutoff valve 44, the first emergency release coupling 61, and the second emergency release coupling 62 may be of an electromagnetic type, an electric type, or a hydraulic type or may be able to be manually operated. Moreover, each of the first emergency release coupling 61 and the second emergency release coupling 62 may be uncoupled when the ship 2 moves in a direction away from a shore by strong wind or the like, and this applies a load of a predetermined value or more.

Moreover, in the above embodiment, the on-off valve 91 is opened in the second step. However, the emergency release method in the present disclosure is not limited to this. For example, in the piping system described in the above embodiment, instead of the on-off valve 91, the on-off valve 23a that is a device at the ship side may be opened. Even in this case, the difference between the pressure of the liquid hydrogen remaining between the shutoff valve 44 and the shutoff valve 21a and the atmospheric pressure can be reduced, and therefore, the amount of leakage of the liquid hydrogen when uncoupling the first emergency release coupling 61 can be suppressed.

Moreover, the emergency release method according to the present disclosure is applicable to a liquid hydrogen transfer system that does not include the ship-side gas pipe 22, the hydrogen gas pipe 50, and the like.

Figure 3:
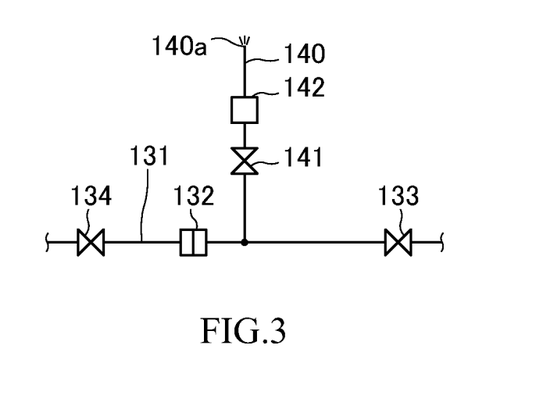
FIG. 3 is a diagram showing a part of a piping system of the liquid hydrogen transfer system including the portable cargo handling equipment according to Modified Example.

For example, FIG. 3 shows a part of a piping system of a liquid hydrogen transfer system including portable cargo handling equipment according to Modified Example. The liquid hydrogen transfer system shown in FIG. 3 includes: a liquid pipe 131 which guides liquid hydrogen from one of a ship-side cryogenic tank and a land-side cryogenic tank to the other; an emergency release coupling 132 located at the liquid pipe 131; a first shutoff valve 133 located at a portion of the liquid pipe 131 which is located between the emergency release coupling 132 and the land-side cryogenic tank; a second shutoff valve 134 located at a portion of the liquid pipe 131 which is located between the emergency release coupling 132 and the ship-side cryogenic tank; an atmosphere open pipe 140 including one end connected to a portion of the liquid pipe 131 which is located between the emergency release coupling 132 and the first shutoff valve 133, and the other end that is open to the atmosphere; and an on-off valve 141 located at the atmosphere open pipe 140. The liquid pipe 131 includes: a land-side liquid pipe extending from the land-side cryogenic tank; a ship-side liquid pipe extending from the ship-side cryogenic tank; and a liquid hydrogen pipe connected to the land-side liquid pipe and the ship-side liquid pipe and included in the portable cargo handling equipment. In FIG. 3, connection portions among the land-side liquid pipe, the ship-side liquid pipe, and the liquid hydrogen pipe, and the like are not shown. According to the liquid hydrogen transfer system described above, the same effects as the above embodiment can be obtained by closing the first shutoff valve 133 and the second shutoff valve 134, opening the on-off valve 141, and then starting uncoupling the emergency release coupling 132.

In the liquid hydrogen transfer system shown in FIG. 3, it is preferable that a heating device 142 be located at a portion of the atmosphere open pipe 140 which is located between the on-off valve 141 and an end portion 140a that is open to the atmosphere. The heating device 142 may be the same in structure as the heating device 82 described in the above embodiment. The liquid hydrogen or the hydrogen gas generated by the evaporation of the liquid hydrogen, which has flowed through the on-off valve 141, can be heated by the heating device 142. With this, the liquid hydrogen can be prevented from flowing out to the atmosphere through the atmosphere open pipe 140, and the generation of the liquid air can be suppressed by the hydrogen gas discharged to the atmosphere at the end portion 140a of the atmosphere open pipe 140.

Moreover, the above embodiment has described the method of transferring the liquid hydrogen from the land-side cryogenic tank 10 to the ship-side cryogenic tank 20. However, the present disclosure is also applicable to a method of transferring the liquid hydrogen from the ship-side cryogenic tank 20 to the land-side cryogenic tank 10.

The functionality of the elements disclosed herein may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. The processor may be a programmed processor which executes a program stored in a memory. In the disclosure, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

Portable cargo handling equipment for liquid hydrogen according to one aspect of the present disclosure is portable cargo handling equipment for liquid hydrogen. The portable cargo handling equipment is located between a ship-side cryogenic tank and a land-side cryogenic tank and transfers the liquid hydrogen from one of the ship-side cryogenic tank and the land-side cryogenic tank to the other. The portable cargo handling equipment includes: a liquid hydrogen pipe through which the liquid hydrogen is guided and which includes a first joint connectable to an end portion of a ship-side liquid pipe extending from the ship-side cryogenic tank and a second joint connectable to an end portion of a land-side liquid pipe extending from the land-side cryogenic tank; an emergency release coupling located at the liquid hydrogen pipe; a shutoff valve located at a portion of the liquid hydrogen pipe which is located between the emergency release coupling and the second joint; and an atmosphere open structure including an atmosphere open passage including one end communicating with a portion of the liquid hydrogen pipe which is located between the first joint and the shutoff valve, and the other end that is open to an atmosphere, an on-off valve that opens and closes the atmosphere open passage, and a heating device that is located at the atmosphere open passage and heats the liquid hydrogen guided by the atmosphere open passage or a hydrogen gas generated by evaporation of the liquid hydrogen and guided by the atmosphere open passage.

According to this configuration, by opening the on-off valve before uncoupling the emergency release coupling, the pressure of the liquid hydrogen remaining in a portion of the liquid hydrogen pipe which is located between the emergency release coupling and the shutoff valve can be reduced. With this, the difference between the pressure of the remaining liquid hydrogen and the atmospheric pressure can be reduced, and therefore, the amount of leakage of the liquid hydrogen when uncoupling the emergency release coupling can be suppressed. Moreover, the liquid hydrogen or the hydrogen gas generated by the evaporation of the liquid hydrogen can be heated by the heating device located at the atmosphere open passage. With this, the liquid hydrogen can be prevented from flowing out to the atmosphere through the atmosphere open passage, and the generation of the liquid air can be suppressed by the hydrogen gas discharged to the atmosphere through the atmosphere open passage.

The portable cargo handling equipment may include: a hydrogen gas pipe including a third joint connectable to an end portion of a ship-side gas pipe extending from the ship-side cryogenic tank; a vent pipe through which the hydrogen gas guided from the ship-side cryogenic tank is discharged, the vent pipe including one end connected to the hydrogen gas pipe and the other end that is open to the atmosphere; a second emergency release coupling which is located at the hydrogen gas pipe and is different from a first emergency release coupling that is the emergency release coupling; and a connection pipe connecting the hydrogen gas pipe and a portion of the liquid hydrogen pipe which is located between the first joint and the shutoff valve, wherein: the atmosphere open passage includes the connection pipe, the vent pipe, and a portion of the hydrogen gas pipe which is located between the connection pipe and the vent pipe; the on-off valve is located at the connection pipe; and the heater is located at the vent pipe or the portion of the hydrogen gas pipe which is located between the connection pipe and the vent pipe. According to this configuration, while the liquid hydrogen is supplied from the land-side cryogenic tank to the ship-side cryogenic tank, the hydrogen gas generated by the evaporation of the liquid hydrogen in the ship-side cryogenic tank can be discharged to the atmosphere through the ship-side gas pipe, the hydrogen gas pipe, and the vent pipe. Therefore, the pressure increase of the ship-side cryogenic tank can be suppressed, and the liquid hydrogen can be transferred from the land-side cryogenic tank to the ship-side cryogenic tank with small power. Moreover, the heating device can be used for both of the heating performed when the hydrogen gas generated by the evaporation in the ship-side cryogenic tank is discharged to the atmosphere and the heating performed when the hydrogen gas generated by the evaporation of the remaining liquid hydrogen at the time of the uncoupling in an emergency is discharged to the atmosphere.

A diameter of the connection pipe may be equal to or larger than a diameter of the liquid hydrogen pipe. According to this configuration, before uncoupling the first emergency release coupling and the second emergency release coupling, the depressurization of the liquid hydrogen remaining between the first emergency release coupling and the shutoff valve can be quickly executed.

The portable cargo handling equipment may further include a purge gas supplier that selectively supplies a nitrogen gas and a hydrogen gas as a purge gas to the liquid hydrogen pipe. Since air and nitrogen are solidified by the liquid hydrogen, the pipes need to be filled with the hydrogen gas before transferring the liquid hydrogen. According to the above configuration, in the portable cargo handling equipment, air in the pipes can be purged with the nitrogen gas, and then, the nitrogen gas in the pipes can be purged with the hydrogen gas.

The portable cargo handling equipment may further include circuitry configured to control opening and closing operations of the on-off valve so as to open the on-off valve after the shutoff valve is closed and before the emergency release coupling is uncoupled. According to this configuration, the pressure of the liquid hydrogen remaining between the emergency release coupling and the shutoff valve can be automatically reduced before uncoupling the emergency release coupling.

In addition to the opening and closing operations of the on-off valve, the circuitry may control opening and closing operations of the shutoff valve and uncoupling of the emergency release coupling. According to this configuration, a series of steps of closing the shutoff valve, opening a depressurization valve, and then uncoupling the emergency release coupling can be automatically executed by the circuitry.

The shutoff valve may be a first shutoff valve. A second shutoff valve may be located at the ship-side liquid pipe. The portable cargo handling equipment may further include circuitry configured to control opening and closing operations of the first shutoff valve and opening and closing operations of the second shutoff valve. According to this configuration, both of the first shutoff valve included in the portable cargo handling equipment and the second shutoff valve of the ship-side liquid pipe extending from the ship-side cryogenic tank can be operated by the circuitry of the portable cargo handling equipment for the liquid hydrogen. Therefore, the first shutoff valve and the second shutoff valve can be easily operated at the same time.

The first shutoff valve and the second shutoff valve may be respectively a first air drive valve and a second air drive valve each of which switches between a closed state and an open state when air is supplied or when the supply of the air stops. The portable cargo handling equipment may further include an air supplier that is controlled by the circuitry and supplies the air to the first air drive valve and the second air drive valve. According to this configuration, since the second shutoff valve that is equipment at the ship side can be driven by the presence or absence of air supply, a control wire used to control the second shutoff valve does not have to be included at the ship side.

Moreover, an emergency release method according to one aspect of the present disclosure is an emergency release method of dividing a liquid hydrogen transfer system into a ship side and a land side in an emergency, the liquid hydrogen transfer system including: a liquid pipe that guides liquid hydrogen from one of a ship-side cryogenic tank and a land-side cryogenic tank to the other; an emergency release coupling located at the liquid pipe; a first shutoff valve located at a portion of the liquid pipe which is located between the emergency release coupling and the land-side cryogenic tank; a second shutoff valve located at a portion of the liquid pipe which is located between the emergency release coupling and the ship-side cryogenic tank; and an on-off valve by which a portion of the liquid pipe which is located between the first shutoff valve and the second shutoff valve is open to an atmosphere. The emergency release method includes: closing the first shutoff valve and the second shutoff valve; opening the on-off valve; and starting uncoupling the emergency release coupling after closing the first shutoff valve and the second shutoff valve and opening the on-off valve.

According to this method, by opening the on-off valve before uncoupling the emergency release coupling, the pressure of the liquid hydrogen remaining in a portion of the liquid pipe which is located between the first shutoff valve and the second shutoff valve can be reduced. With this, the difference between the pressure of the remaining liquid hydrogen and the atmospheric pressure can be reduced, and therefore, the amount of leakage of the liquid hydrogen when uncoupling the emergency release coupling can be suppressed.

The invention claimed is:

1. Portable cargo handling equipment for liquid hydrogen, the portable cargo handling equipment being located between a ship-side cryogenic tank and a land-side cryogenic tank and transferring the liquid hydrogen from one of the ship-side cryogenic tank and the land-side cryogenic tank to the other, the portable cargo handling equipment comprising:
a liquid hydrogen pipe through which the liquid hydrogen is guided and which includes:
a first joint connectable to an end portion of a ship-side liquid pipe extending from the ship-side cryogenic tank and
a second joint connectable to an end portion of a land-side liquid pipe extending from the land-side cryogenic tank;
an emergency release coupling located at the liquid hydrogen pipe;
a first shutoff valve located at a portion of the liquid hydrogen pipe which is located between the emergency release coupling and the second joint; and
an atmosphere open structure including:
an atmosphere open passage including one end communicating with a portion of the liquid hydrogen pipe which is located between the first joint and the first shutoff valve, and the other end that is open to an atmosphere,
an on-off valve that opens and closes the atmosphere open passage, and
a heater that is located at the atmosphere open passage and heats the liquid hydrogen guided by the atmosphere open passage or a hydrogen gas generated by evaporation of the liquid hydrogen and guided by the atmosphere open passage,
wherein a second shutoff valve is located at the ship-side liquid pipe,
wherein the portable cargo handling equipment further comprises circuitry configured to control opening and closing operations of the first shutoff valve and opening and closing operations of the second shutoff valve,
wherein the circuitry controls the opening and closing operations of the first shutoff valve and the opening and closing operations of the second shutoff valve so as to close the first shutoff valve and the second shutoff valve before the emergency release coupling is uncoupled, and
wherein the circuitry controls opening and closing operations of the on-off valve so as to open the on-off valve after the first shutoff valve and the second shutoff valve are closed.

2. The portable cargo handling equipment according to claim 1, comprising:
a hydrogen gas pipe including a third joint connectable to an end portion of a shipside gas pipe extending from the ship-side cryogenic tank;
a vent pipe through which the hydrogen gas guided from the ship-side cryogenic tank is discharged, the vent pipe including one end connected to the hydrogen gas pipe and the other end that is open to the atmosphere;
a second emergency release coupling which is located at the hydrogen gas pipe and is different from a first emergency release coupling that is the emergency release coupling; and
a connection pipe connecting the hydrogen gas pipe and a portion of the liquid hydrogen pipe which is located between the first joint and the first shutoff valve, wherein:
the atmosphere open passage includes the connection pipe, the vent pipe, and a portion of the hydrogen gas pipe which is located between the connection pipe and the vent pipe;
the on-off valve is located at the connection pipe; and
the heater is located at the vent pipe or the portion of the hydrogen gas pipe which is located between the connection pipe and the vent pipe.

3. The portable cargo handling equipment according to claim 2, wherein a diameter of the connection pipe is equal to or larger than a diameter of the liquid hydrogen pipe.

4. The portable cargo handling equipment according to claim 1, further comprising a purge gas supplier that selectively supplies a nitrogen gas and a hydrogen gas as a purge gas to the liquid hydrogen pipe.

5. The portable cargo handling equipment according to claim 1,
wherein the first shutoff valve and the second shutoff valve are respectively a first air drive valve and a second air drive valve each of which switches between a closed state and an open state when air is supplied or when the supply of the air stops,
the portable cargo handling equipment further comprising an air supplier that is controlled by the circuitry and supplies the air to the first air drive valve and the second air drive valve.

* * * * *